(12) United States Patent
Tomlinson et al.

(10) Patent No.: US 9,779,244 B1
(45) Date of Patent: Oct. 3, 2017

(54) ESTABLISHING SECURE INITIAL STATE IN A PROCESSING PLATFORM CONTAINING BOTH HIGH ASSURANCE SECURITY AND SAFETY-CRITICAL FUNCTIONS

(75) Inventors: Brandon L. Tomlinson, Coralville, IA (US); Kevin R. Priest, Knoxville, IA (US); Branden H. Sletteland, Marion, IA (US); Michael J. Frerking, Marion, IA (US); Cheryl L. Killham, Marion, IA (US); Brian S. Cain, Cedar Rapids, IA (US); Jeffrey B. McNamara, Marion, IA (US); Greg L. Shelton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 657 days.

(21) Appl. No.: 13/585,017

(22) Filed: Aug. 14, 2012

(51) Int. Cl.
*G06F 15/177* (2006.01)
*G06F 11/00* (2006.01)
*G06F 12/14* (2006.01)
*G08B 23/00* (2006.01)
*G06F 21/57* (2013.01)
*G06F 11/14* (2006.01)

(52) U.S. Cl.
CPC ........ *G06F 21/575* (2013.01); *G06F 11/1417* (2013.01)

(58) Field of Classification Search
CPC ...... G06F 9/4416; G06F 9/45558; G06F 9/50; G06F 11/1417; G06F 21/57; G06F 21/71; G06F 21/575
USPC .......................................................... 713/1
See application file for complete search history.

(56) References Cited

U.S. PATENT DOCUMENTS

| | | | | |
|---|---|---|---|---|
| 6,539,438 | B1 * | 3/2003 | Ledzius et al. | 710/8 |
| 7,030,647 | B1 * | 4/2006 | White et al. | 326/38 |
| 7,146,598 | B2 * | 12/2006 | Horanzy | 716/128 |
| 8,370,939 | B2 * | 2/2013 | Zaitsev | G06F 21/56 |
| | | | | 726/23 |
| 2010/0070970 | A1 * | 3/2010 | Hu et al. | 718/1 |

(Continued)

OTHER PUBLICATIONS

White, How Computers Work, 2002, Que, 6th ed, pp. 16-17.*

(Continued)

*Primary Examiner* — Mark Connolly
(74) *Attorney, Agent, or Firm* — Angel N. Gerdzhikov; Donna P. Suchy; Daniel M. Barbieri (57) ABSTRACT

A method including initializing the processing platform, wherein initializing the processing platform includes performing a power on self-test (POST) configured to determine an operational state of one or more hardware subcomponents of the processing platform, the POST further configured to determine an error detection state of one or more monitoring functions of the processing platform, initializing a safety monitoring function of the processing platform, analyzing one or more results of the POST utilizing the safety monitoring function of the processing platform in order to determine compliance of the processing platform with operational requirements, configuring the safety monitoring function of the processing platform utilizing one or more sets of safety monitoring configuration data, initializing and configuring a security monitoring function of the processing platform, and initializing and configuring one or more security functions.

22 Claims, 4 Drawing Sheets

(56) References Cited

U.S. PATENT DOCUMENTS

2010/0146257 A1* 6/2010 Yamamoto .................... 713/100
2014/0181489 A1* 6/2014 Vicente et al. ................... 713/2

OTHER PUBLICATIONS

Multiple Independent Levels of Security, https://web.archive.org/web/20120131032351/http://en.wikipedia.org/wiki/Multiple_Independent_Levels_of_Security, Jan. 31, 2012.*

* cited by examiner

ESTABLISHING SECURE INITIAL STATE IN A PROCESSING PLATFORM CONTAINING BOTH HIGH ASSURANCE SECURITY AND SAFETY-CRITICAL FUNCTIONS

TECHNICAL FIELD

The present invention generally relates a computer processing platform and, in particular, establishing a secure initial state in a processing platform that contains both high assurance security and safety-critical functions.

BACKGROUND

As requirements for computational and networking systems continue to increase so too will the demand for processing platforms with reduced size, weight and power requirements. Due to increased constraints on platform size, weight, and power requirements (SWAP), some presently implemented systems simultaneously perform safety-critical functions and high assurance multi-level security (MLS)/Multiple Independent Levels of Security (MILS) functions utilizing a common hardware architecture. Prior to the implementation of safety-critical functions and high assurance security functions on common hardware, physically separated federated systems were utilized to handle either safety or security functions.

One challenge in systems implementing safety-critical functions and high assurance security functions on a common hardware platform is the reconciliation of the allocation of operational requirements between safety and security domains. For example, Level A DO-178B software and DO-254 hardware requirements are levied for safety-critical certification, while EAL 6 Common Criteria requirements are levied for high assurance security certification. Due to the identified shortcomings of the prior art, it is desirable to provide a method and platform capable of reconciling these shortfalls, thereby reducing the size, weight, power requirements, and cost of an implementing platform.

SUMMARY

A method for achieving a secure initial state in a processing platform hosting both safety-critical and high assurance security functions is disclosed. In one aspect, the method may include, but is not limited to, initializing the processing platform, wherein initializing the processing platform includes performing a power on self-test (POST) configured to determine an operational state of one or more hardware sub-components of the processing platform, the POST further configured to determine an error detection state of one or more monitoring functions of the processing platform; initializing a safety monitoring function of the processing platform; analyzing one or more results of the POST utilizing the safety monitoring function of the processing platform in order to determine compliance of the processing platform with operational requirements; configuring the safety monitoring function of the processing platform utilizing one or more sets of safety monitoring configuration data; initializing and configuring a security monitoring function of the processing platform; initializing and configuring one or more security functions.

A method for achieving a secure initial state in a processing platform hosting both safety-critical and high assurance security functions is disclosed. In one aspect, the method may include, but is not limited to, initializing the processing platform and a safety monitoring function of the processing platform, wherein initializing the processing platform includes performing a power on self-test (POST) configured to determine compliance of the processing platform with an operational requirement of the processing platform; upon a determination of compliance of the processing platform with an operational requirement of the processing platform, configuring the safety monitoring function of the processing platform utilizing one or more sets of safety monitoring configuration data; initializing and configuring a security monitoring function of the processing platform; and initializing and configuring one or more security functions.

A non-transitory computer readable medium storing computer executable instructions which, when executed by one or more processors, cause the one or more processors to carry out a method for achieving a secure initial state in a processing platform hosting both safety-critical and high assurance security functions is disclosed. In one aspect, the method may include, but is not limited to, initializing a processing platform of the one or more processors, wherein initializing the processing platform includes performing a power on self-test (POST) configured to determine an operational state of one or more hardware sub-components of the processing platform, the POST further configured to determine an error detection state of one or more monitoring functions of the processing platform; initializing a safety monitoring function of the processing platform; analyzing one or more results of the POST utilizing the safety monitoring function of the processing platform in order to determine compliance of the processing platform with operational requirements; configuring the safety monitoring function of the processing platform utilizing one or more sets of safety monitoring configuration data; initializing and configuring a security monitoring function of the processing platform; and initializing and configuring one or more security functions.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Figure 1A:
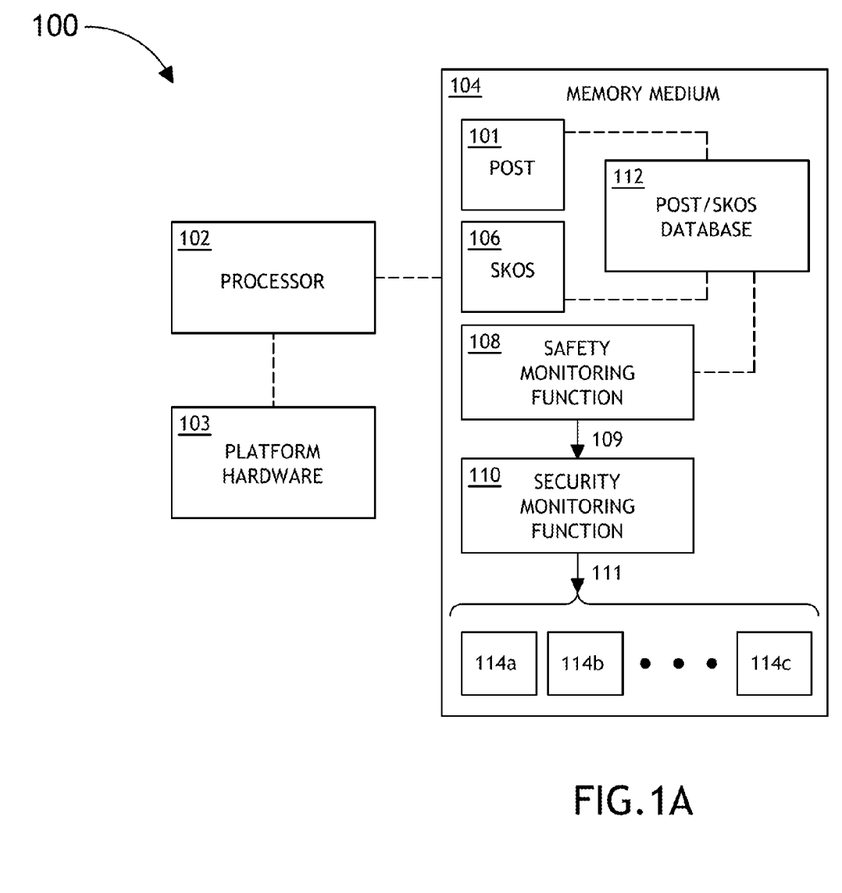
FIG. 1A illustrates a block diagram view of the processing platform hosting both safety-critical and high assurance security functions suitable for achieving a secure initial state, in accordance with one embodiment of the present invention.
Figure 1B:
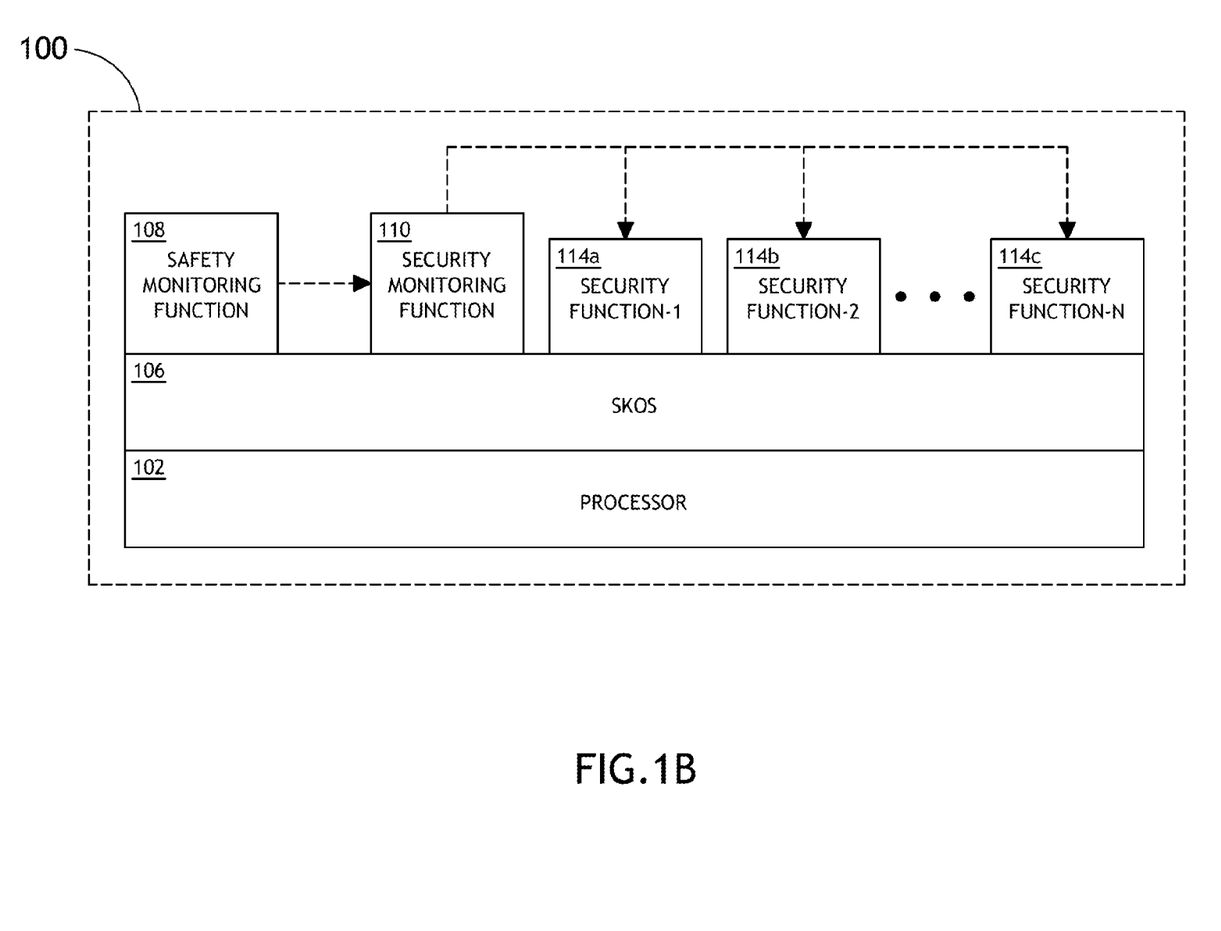
FIG. 1B illustrates a block diagram view of the processing platform hosting both safety-critical and high assurance security functions suitable for achieving a secure initial state, in accordance with one embodiment of the present invention.

Referring generally to FIGS. 1A and 1B, a processing platform 100 hosting both safety-critical and high assurance security functions suitable for achieving a secure initial state is described in accordance with the present disclosure. Systems implementing both safety-critical functions and high assurance security functions on a common hardware platform require reconciliation of the allocation of operational requirements between safety and security domains. It is recognized that a system performing high assurance security functions, such as embedded Cross Domain guards, requires establishment of a secure initial state prior to performing its designated enforcement functions. The present invention is directed to a processing platform 100, hosting both safety-critical and high assurance security functions, capable of secure start up.

For the purpose of the present disclosure, the term "secure state" is synonymous with the following features. A secure state requires that the data of a high assurance security function is both consistent and uncorrupted, and that the high assurance security function (e.g., 114a-114c) may correctly enforce the provided security policy. Moreover, the term "secure initial state" is interpreted to define the first point in time after successful system initialization at which point the system is able to enforce its Information Flow Control (IFC) security policy. Further, all actions and/or transitions of the security function subsequent to the achievement of a secure initial state are allowed by the security model of the platform and do not first require a secure initial state. In addition, all actions and/or transitions of the security function subsequent to the achievement of a secure initial state may result in a transition of a given function to the secure initial state. For instance, all actions and/or transitions of the security function subsequent to the achievement of a secure initial state may result in a transition of the TOE security functionality (TSF) to the secure initial state.

Moreover, an initialization function may include a boot mechanism suitable for establishing the security domain and bringing the software portion of the implementation (i.e., security function) and associated data into the security domain. It is further noted that initialization may occur as a result of a system "power on" or as a result of a system "restart."

FIGS. 1A and 1B illustrate block diagram views of the processing platform 100 hosting both safety-critical and high assurance security functions suitable for achieving a secure initial state, in accordance with one embodiment of the present invention. The processing platform 100 may include one or more computer processors 102. The processing platform 100 may further include a non-transitory storage medium 104 (i.e., memory medium) containing program instructions configured to cause the one or more processors 102 to carry out the various steps described through the present disclosure. The processing platform 100 may be configured to implement a separation kernel operating system (SKOS) 106, as shown in FIG. 1B. It should be recognized that the utilization of a SKOS allows for hosting of both safety-critical and high assurance security functions on a common processing platform 100. However, on a single processing platform performing high assurance security and safety-critical functions, the various security enforcement components of the platform may not, by themselves, have access to the resources required to determine whether a secure initial state has been achieved in the processing platform. As such, in order to achieve a secure initial state in a high assurance security/safety-critical system, numerous components of the system must be coordinated and successfully initialized and configured. For purposes of clarity, it is noted herein that that safety monitoring function 108, the security monitoring function 110, and/or the one or more security functions 114a-114c may be implemented utilizing software, hardware, or firmware of the processing platform 100. The remainder of the present disclosure will describe how a secure initial state is achieved in a high assurance/safety-critical system.

In one aspect of the present invention, the non-transitory storage medium 104 may include programs instructions for causing the one or more processors to: (i) initialize the processing platform 100, wherein initializing the processing platform 100 includes performing a power on self-test (POST) 101 configured to determine an operational state of one or more hardware sub-components (e.g., processor 102 or other platform hardware components 103), the POST further configured to determine an error detection state of one or more monitoring functions of the processing platform 100; (ii) initialize a safety monitoring function of the processing platform; (iii) analyze one or more results of the POST 101 utilizing the safety monitoring function of the processing platform in order to determine compliance of the processing platform 100 with operational requirements; (iv) configure the safety monitoring function 108 of the processing platform 100 utilizing one or more sets of safety monitoring configuration data; (v) initialize and configure a security monitoring function 110 of the processing platform 100; and (vi) initialize and configure one or more security functions 114a-114c.

Program instructions implementing methods such as those described herein may be transmitted over or stored on a carrier medium. The carrier medium may be a transmission medium such as a wire, cable, or wireless transmission link. The carrier medium may also include a memory medium 104 such as a read-only memory, a random access memory, a magnetic or optical disk, or a magnetic tape.

In general, the term "processor" may be broadly defined to encompass any device having one or more processors, which execute instructions from a memory medium. In this sense, the one or more processors 102 may include any microprocessor-type device configured to execute software algorithms and/or instructions. In one embodiment, the one or more processors 102 may consist of a desktop computer or other computer system (e.g., networked computer) configured to execute a program configured to operate the system 100, as described throughout the present disclosure. It should be recognized that the steps described throughout the present disclosure may be carried out by a single computer system or, alternatively, multiple computer systems.

The embodiments of the system 100 illustrated in FIG. 1 may be further configured as described herein. In addition, the system 100 may be configured to perform any other step(s) of any of the method embodiment(s) described herein.

Figure 2:
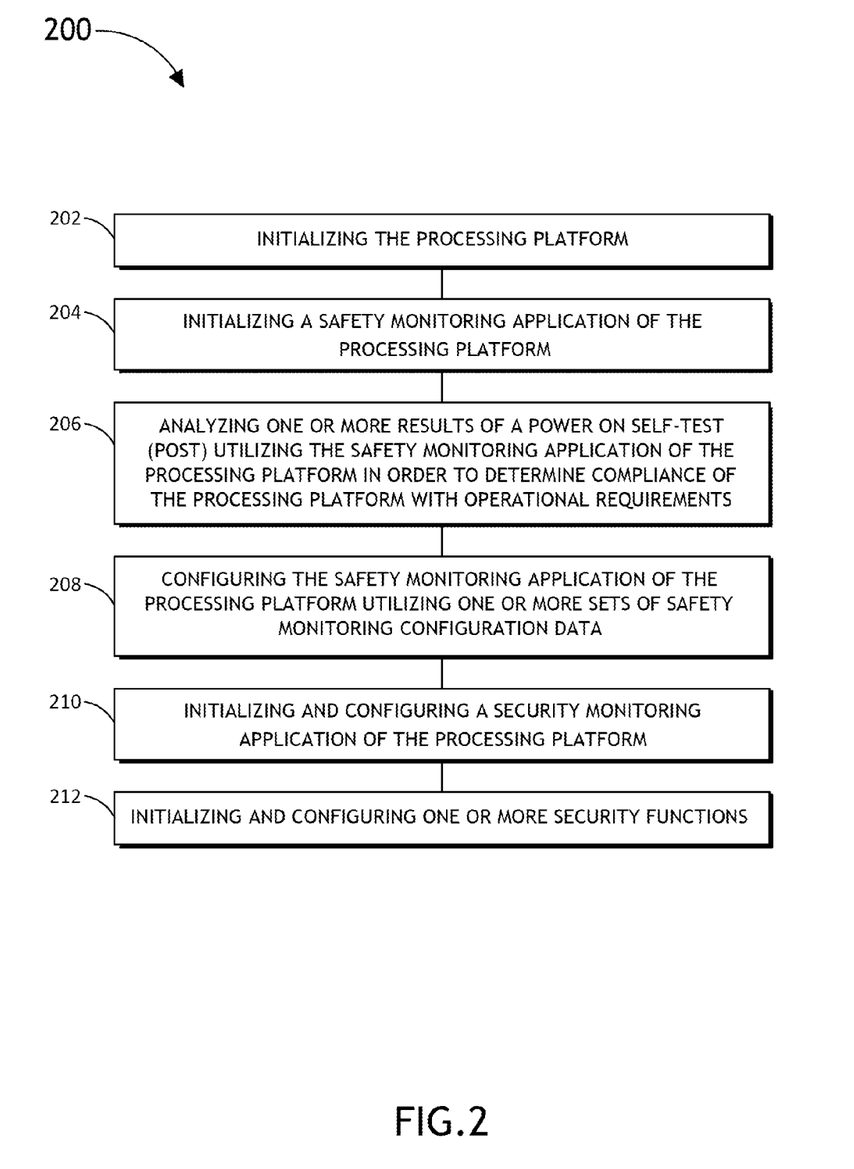
FIG. 2 is a flow chart illustrating a method for achieving a secure initial state in a processing platform hosting both safety-critical and high assurance security functions, in accordance with one embodiment of the present invention.

FIG. 2 illustrates a process flow 200 for achieving a secure initial state in a processing platform host both safety-critical and high assurance security functions, in accordance with one embodiment of the present invention.

In step 202, the powered-on processing platform 100 is initialized. In one aspect of the present invention, the initialization of the processing platform 100 may begin upon occurrence of a triggering event. In one embodiment, the triggering event may include the providing of power to the processing platform 100, whereby the processing platform 100 is "powered up" or "turned on." In another embodiment, the triggering event may include the restarting of the processing platform 100.

In one aspect of the present invention, initialization of the processing platform 100 may include performing a power on self-test (POST) 101. In a further aspect, the POST 101 may be configured to determine an operational state of one or more hardware sub-components (e.g., processor 102, peripheral devices, and the like) of the processing platform 100. In another aspect, the POST may be configured to determine an error detection state of one or more monitoring functions (e.g., safety monitoring function 108 or security monitoring function 110) of the processing platform 100. In this regard, the one or more processors 102 may perform a POST operation 101 in order to test one or more hardware subcomponents for correct operation as well as testing each monitoring function for correct error detection.

In another embodiment of the present invention, initializing the processing platform 100 may include determining an error detection state of one or more monitoring functions (e.g., safety monitoring function 108 or security monitoring function 110) utilizing the Separation Kernel Operating System (SKOS) 106. In an additional embodiment, initializing the processing platform 100 may include determining an error detection state of one or more monitoring functions utilizing the underlying processing platform. In this regard, the processing platform 100 may perform a safety check and/or a security check of the safety monitoring function 108 and/or the security monitoring function 110 utilizing either the SKOS 106 or the underlying processing platform.

In a further embodiment, the SKOS and/or underlying processing platform may store the results of the safety and/or security check of the one or more monitoring functions in memory 104. For example, the platform 100 may store results of a safety and/or security check in a "POST/SKOS Results Database" 112 maintained on the memory device 104 of the processing platform 100.

In step 204, a safety monitoring function 108 is initialized. In this regard, following booting of the underlying processing platform and/or SKOS 106 and the security/safety checks of the monitoring functions, the safety monitor function 108 may start up.

In step 206, upon initialization of the safety monitoring function 108 by the processing platform 100, the safety monitoring function 108 may analyze the POST results. In one aspect, the safety monitoring function 108 may read in POST results of step 202 (e.g., POST results stored in POST/SKOS database 112). In this regard, the safety monitoring function 108 may analyze the POST results of step 202 in order to determine compliance of hardware subcomponents (e.g., processor 102) of the processing platform 100 with operational requirements (i.e., whether system hardware is functioning properly). In addition, the safety monitoring function 108 may analyze the POST results of step 202 in order to determine compliance of the underlying processing platform with operational requirements (i.e., whether underlying processing platform is functioning properly).

In another embodiment, the safety monitoring function 108 may read in SKOS results described above (e.g., SKOS results stored in POST/SKOS database 112). In this regard, the safety monitoring function 108 may analyze the SKOS results described above in order to determine compliance of the SKOS 106 with operational requirements (i.e., whether SKOS is functioning properly).

In step 208, the safety monitoring function 108 is configured. In this regard, upon confirming the hardware of the processing platform 100 is secure, the safety monitoring function 108 may read in its own configuration data (e.g., retrieve from memory 104). In further embodiment, upon configuration of the safety monitoring function 108, the safety monitoring function 108 may transmit a notification 109 to a security monitoring function 110 indicating that the safety monitoring function 108, hardware of the processing platform, and the underlying processing platform are secure.

In step 210, the security monitoring function 110 is initialized and configured. In this regard, following booting of the underlying processing platform and/or SKOS 106 and the security/safety checks of the monitoring functions, the security monitor function 110 may start up. Following initialization, the security monitor function 110 may retrieve its own configuration data (e.g., retrieve from memory 104) from a specified configuration data location. In this regard, the security monitoring configuration data defines the auditing policy and oversight functions that the operational requirements require the security function 110 to enforce.

In a further embodiment, following configuration, the security monitoring function 110 waits for the notification transmitted from the safety monitoring function 108 indicating that the safety monitor 108 is secure. Upon receiving the notification 109 from the safety monitor 108, the security monitoring function 110 may transmit an additional notification 111 to all high assurance security functions 114 of the processing platform 100 indicating that the security monitoring function 110 is configured and secure.

It is recognized herein that the initialization/configuration of the safety monitoring function 108 and the security monitoring function 110 need not be sequential. It is anticipated that in some settings the initialization and configuration of the security monitoring function 110 may begin prior to receiving a security compliance notification from the safety monitoring function 108 (as described in step 208 above). In a further embodiment, in settings wherein the security monitoring function 110 receives the notification 109 from the safety monitoring function 108 prior to being fully configured, the security monitoring function 110 must delay transmission of a notification to other security functions 114 (e.g., 114b, 114c and the like) of the processing platform 110 until the security monitoring function 110 is fully configured.

In step 212, one or more security functions 114 are initialized and configured. In this regard, following initialization, an individual security function 114a may retrieve configuration data associated with the function 114a and may configure itself correspondingly. In this regard, the security function configuration data defines the security policy of the security function 114a.

In a further embodiment, following configuration, an individual security function 114a may wait for a notification 111 from the security monitoring function 110 indicating that the security monitoring function 110 is configured and secure. Upon receiving the notification 111 from the security monitor 111, the secure initial state needed for high assurance security functions 114a-114c have been achieved. Once the secure initial state has been achieved the one or more security functions 114a-114c may perform security enforcement functions.

In a further embodiment, in settings wherein a given security function (e.g., 114a-114c) receives the notification 111 from the security monitoring function 110 prior to being fully configured, the given security monitoring function (e.g., 114a-114c) must delay enforcement of its security policy until the security monitoring function is fully configured.

Applicant notes that the above ordering of steps should not be interpreted as limiting. It is anticipated that at least a portion of the steps of process 200 may be carried out in a different order. For example, it is recognized herein that the initialization and configuration of the security monitoring function 110 may precede configuration of the safety monitoring function 108. In this regard, the security monitoring function 110 may read in its own configuration data, upon confirming the hardware 103 of the processing platform 100 is secure. Then, the safety monitoring function 108 may undergo initialization and configuration.

Figure 3:
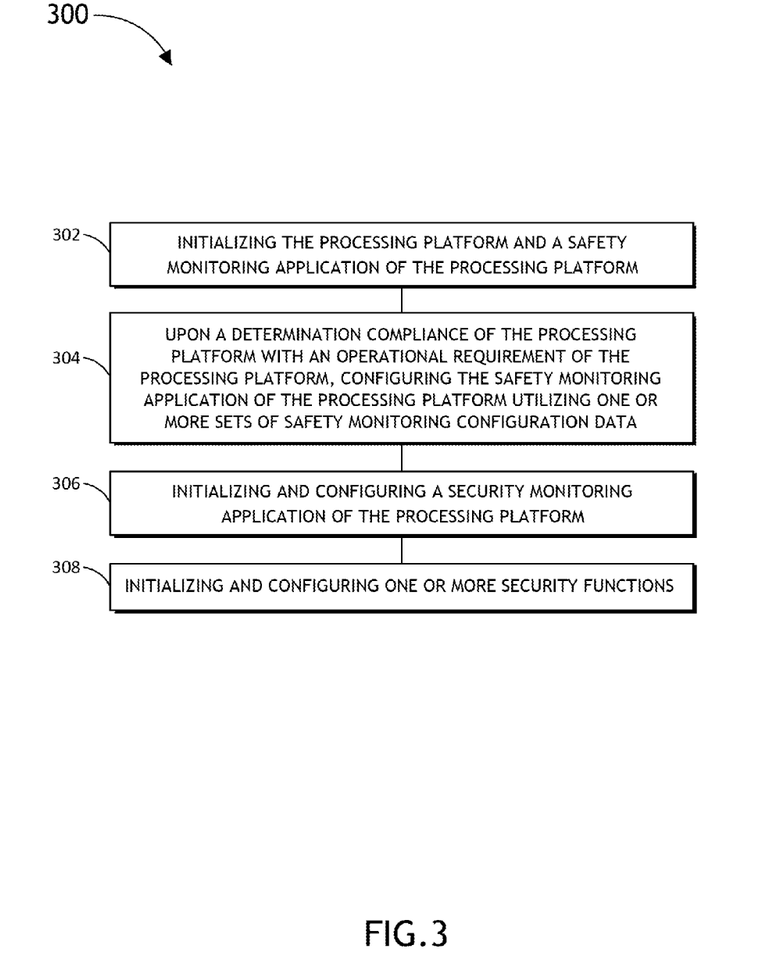
FIG. 3 is a flow chart illustrating a method for achieving a secure initial state in a processing platform hosting both safety-critical and high assurance security functions, in accordance with an alternative embodiment of the present invention.

FIG. 3 illustrates a process flow 300 for achieving a secure initial state in a processing platform hosting both safety-critical and high assurance security functions, in accordance with an alternative embodiment of the present invention. It is noted herein that unless otherwise noted the description of various steps of process flow 200 should be interpreted to extend to process flow 300.

In step 302, the processing platform 100 and a safety monitoring function 108 are initialized. In one aspect of the present invention, the initialization of the processing platform 100 and a safety monitoring function may begin upon occurrence of a triggering event. In one embodiment, the triggering event may include the providing of power to the processing platform 100, whereby the processing platform 100 is "powered up" or "turned on." In another embodiment, the triggering event may include the restarting of the processing platform 100.

In one aspect of the present invention, initialization of the processing platform 100 may include performing a power on self-test (POST) 101. In one aspect, the POST 101 may be configured to determine an operational state of one or more hardware sub-components of the processing platform 100. In another aspect, the POST may be configured to determine an error detection state of one or more monitoring functions (e.g., safety monitoring function 108 or security monitoring function 110) of the processing platform 100. In this regard, the one or more processors 102 may perform a POST operation 101 in order to test one or more hardware sub-components for correct operation as well as testing each monitoring function for correct error detection. Upon initialization of the safety monitoring function 108, the safety monitoring function 108 may analyze the POST results. In this regard, the safety monitoring function 108 may analyze the POST results in order to determine compliance of hardware subcomponents (e.g., processor 102) of the processing platform 100 with operational requirements (i.e., whether system hardware is functioning properly). In addition, the safety monitoring function 108 may analyze the POST results in order to determine compliance of the underlying processing platform with operational requirements (i.e., whether underlying processing platform is functioning properly).

In step 304, the safety monitoring function 108 is configured. In this regard, upon confirming the hardware of the processing platform 100 is secure, the safety monitoring function 108 may read in its own configuration data. In further embodiment, upon configuration of the safety monitoring function 108, the safety monitoring function 108 may transmit a notification 109 to a security monitoring function 110 indicating that the safety monitor 108, hardware of the processing platform, and the underlying processing platform are secure.

In step 306, the security monitoring function 110 is initialized and configured. In this regard, following booting of the underlying processing platform and/or SKOS 106 and the security/safety checks of the monitoring functions, the security monitor function 110 may start up. Following initialization, the security monitor function 110 may retrieve its own configuration data (e.g., retrieve from memory 104) from a specified configuration data location. In a further embodiment, following configuration, the security monitoring function 110 waits for the notification transmitted from the safety monitoring function 108 indicating that the safety monitor 108 is secure. Upon receiving the notification 109 from the safety monitor 108, the security monitoring function 110 may transmit an additional notification 111 to all high assurance security functions 114 of the processing platform 100 indicating that the security monitoring function 110 is configured and secure.

In step 308, one or more security functions 114 are initialized and configured. In this regard, following initialization, an individual security function 114a may retrieve configuration data associated with the function 114a and may configure itself correspondingly.

In a further embodiment, following configuration, an individual security function 114a may wait for a notification 111 from the security monitoring function 110 indicating that the security monitoring function 110 is configured and secure. Upon receiving the notification 111 from the security monitor 111, the secure initial state needed for high assurance security functions 114a-114c have been achieved. Once the secure initial state has been achieved the one or more security functions 114a-114c may perform security enforcement functions. Applicant again notes that the above ordering of steps should not be interpreted as limiting. It is anticipated that at least a portion of the steps of process 300 may be carried out in an alternative order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

What is claimed:

1. A method for establishing a secure initial state in a processing platform hosting both safety-critical and high assurance security domains, comprising:
   initializing the processing platform, including performing a power on self-test (POST) including determining an operational state of the processing platform and determining an error detection state of one or more monitoring functions of the processing platform, the one or more monitoring functions including a first monitoring function and a second monitoring function;
   initializing the first monitoring function of the processing platform;
   analyzing one or more results of the POST using the first monitoring function to determine if the processing platform or a separation kernel operating system (SKOS) is in compliance with one or more operational requirements;
   configuring the first monitoring function of the processing platform utilizing one or more sets of configuration data based on the analyzing;
   initializing and configuring the second monitoring function of the processing platform; and
   initializing and configuring one or more assurance security functions to enforce one or more security policies, the one or more assurance security functions being configured after configuration of the first monitoring function and the second monitoring function.

2. The method of claim 1, wherein the initializing the processing platform further comprises:
   upon occurrence of a triggering event, initializing the processing platform, wherein the triggering event comprises one of providing power to the processing platform and restarting the processing platform.

3. The method of claim 1, wherein the determining an error detection state of one or more monitoring functions of the processing platform comprises:
   utilizing the SKOS or the processing platform to perform a safety check or a security check of the one or more monitoring functions; and
   storing results of the safety check or the security check.

4. The method of claim 1, wherein the configuring the first monitoring function of the processing platform based on the analyzing further comprises:
   upon determination of compliance of the processing platform with the one or more operational requirements, configuring the first monitoring function.

5. The method of claim 1, wherein the one or more monitoring functions comprise:
   at least one of a safety monitoring function and a security monitoring function, wherein the second monitoring function waits for a notification from the first monitoring function to configure the second monitoring function.

6. The method of claim 1, further comprising:
   determining the error detection state of the one or more monitoring functions of the processing platform via the SKOS or the processing platform.

7. The method of claim 1, further comprising:
   storing one or more results from at least one of the power on self-test (POST), a safety check of the error detection state determination, or a security check of the error detection state determination.

8. The method of claim 1, wherein the analyzing a result of the POST using the first monitoring function of the processing platform to determine if the processing platform is in compliance with one or more operational requirements further comprises:
   analyzing one or more results of the POST utilizing the first monitoring function of the processing platform in order to determine if one or more hardware subcomponents of the processing platform are in compliance with one or more operational requirements.

9. The method of claim 1, wherein the analyzing a result of the POST using the first monitoring function of the processing platform to determine if the processing platform is in compliance with one or more operational requirements further comprises:
   reading and analyzing one or more stored SKOS results utilizing the first monitoring function of the processing platform in order to determine compliance of the SKOS with one or more operational requirements.

10. The method of claim 1, wherein the first monitoring function comprises a safety monitoring function and the second monitoring function comprises a security monitoring function, the method further comprising:
    upon configuration of the safety monitoring function, notifying the security monitoring function of security compliance of at least one of the safety monitoring function, the SKOS, and one or more hardware components of the processing platform with a security requirement of the processing platform.

11. The method of claim 1, wherein the first monitoring function comprises a safety monitoring function, the second monitoring function comprises a security monitoring function, and the one or more assurance security functions comprise one or more high assurance security functions, the method further comprising:
    upon configuration of the security monitoring function, notifying the one or more high assurance security functions of security compliance of the security monitoring function of the processing platform.

12. The method of claim 1, wherein configuring the second monitoring function of the processing platform comprises:
    after booting of the processing platform or the SKOS and upon determination that the first monitoring function is secure, configuring the second monitoring function, wherein determining that the first monitoring function is secure includes receiving a notification from the first monitoring function.

13. A method for achieving a secure initial state in a processing platform hosting both safety and security domains, comprising:
    initializing the processing platform and a safety monitoring function of the processing platform, the initializing of the processing platform comprising performing a power on self-test (POST) including determining an operational state of the processing platform and determining an error detection state of the safety monitoring function of the processing platform;
    analyzing a result of the POST using the safety monitoring function to determine if the processing platform or a separation kernel operating system (SKOS) are in compliance with one or more operational requirements;
    configuring the safety monitoring function of the processing platform utilizing one or more sets of safety monitoring configuration data based on the analyzing;
    initializing and configuring a security monitoring function of the processing platform; and initializing and configuring one or more assurance security functions to enforce one or more security policies, the assurance security functions being configured after the safety monitoring function and the security monitoring function are configured.

14. A non-transitory computer readable medium storing computer executable instructions which, when executed by one or more processors, cause the one or more processors to carry out a method for establishing a secure initial state in a processing platform hosting a separating kernel operating system (SKOS), the method comprising:

initializing a processing platform of the one or more processors, including performing a power on self-test (POST) including determining an operational state of the processing platform and determining an error detection state of one or more monitoring functions of the processing platform, the one or more monitoring functions including a first monitoring function and a second monitoring function;

initializing the first monitoring function of the processing platform;

analyzing one or more results of the POST using the first monitoring function to determine if the processing platform or the SKOS is in compliance with one or more operational requirements;

configuring the first monitoring function of the processing platform utilizing one or more sets of configuration data based on the analyzing;

initializing and configuring the second monitoring function of the processing platform; and initializing and configuring one or more assurance security functions to enforce one or more security policies, the one or more assurance security functions being configured after configuration of the first monitoring function and the second monitoring function.

15. The non-transitory computer readable medium of claim 14, wherein the one or more monitoring functions comprise:

at least one of a safety monitoring function and a security monitoring function, wherein the second monitoring function waits for a notification from the first monitoring function to read configuration data and configure the second monitoring function.

16. The non-transitory computer readable medium of claim 14, wherein the method further comprises:

determining the error detection state of the one or more monitoring functions of the processing platform via the SKOS.

17. The non-transitory computer readable medium of claim 14, wherein the method further comprises:

determining the error detection state of one or more monitoring functions of the processing platform via the processing platform.

18. The non-transitory computer readable medium of claim 14, wherein the analyzing one or more results of the POST using the first monitoring function of the processing platform to determine if the processing platform or the SKOS is in compliance with one or more operational requirements, comprises:

analyzing one or more results of the POST utilizing the first monitoring function of the processing platform to determine if one or more hardware sub-components of the processing platform are in compliance with one or more operational requirements.

19. The non-transitory computer readable medium of claim 14, wherein the analyzing one or more results of the POST utilizing the safety monitoring function of the processing platform in order to determine compliance of the processing platform with operational requirements comprises:

reading and analyzing one or more stored SKOS results utilizing the first monitoring function of the processing platform in order to determine compliance of the SKOS with one or more operational requirements.

20. The non-transitory computer readable medium of claim 14, wherein the first monitoring function comprises a safety monitoring function and the second monitoring function comprises a security monitoring function, the method further comprising:

upon configuration of the safety monitoring function, notifying the security monitoring function of security compliance of at least one of the safety monitoring function and one or more hardware components of the processing platform with a security requirement of the processing platform.

21. The non-transitory computer readable medium of claim 14, wherein the first monitoring function comprises a safety monitoring function, the second monitoring function comprises a security monitoring function, and the one or more assurance security functions comprise one or more high assurance security functions, the method further comprising:

upon configuration of the security monitoring function, notifying the one or more high assurance security functions of security compliance of the security monitoring function of the processing platform.

22. The non-transitory computer readable medium of claim 14, wherein configuring the second monitoring function of the processing platform comprises:

after booting of the processing platform or the SKOS and upon determination that the first monitoring function is secure, configuring the second monitoring function, wherein determining that the first monitoring function is secure includes receiving a notification from the first monitoring function.

* * * * *